US008565203B2

(12) United States Patent
Ghosh

(10) Patent No.: US 8,565,203 B2
(45) Date of Patent: Oct. 22, 2013

(54) QUIET PERIOD MANAGEMENT FOR EMERGENCY AD HOC NETWORKS IN TV WHITE SPACES

(75) Inventor: Chittabrata Ghosh, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/140,102

(22) PCT Filed: Mar. 22, 2011

(86) PCT No.: PCT/US2011/029347
§ 371 (c)(1),
(2), (4) Date: Jun. 16, 2011

(87) PCT Pub. No.: WO2012/128757
PCT Pub. Date: Sep. 27, 2012

(65) Prior Publication Data
US 2012/0246692 A1 Sep. 27, 2012

(51) Int. Cl.
*H04W 4/00* (2009.01)
(52) U.S. Cl.
USPC ........... 370/338; 370/329; 455/434; 455/450; 455/454
(58) Field of Classification Search
USPC ......... 370/329, 330, 335, 337, 338, 277, 392, 370/399; 455/434, 450, 454, 509, 517, 62, 455/67.11, 67.16
See application file for complete search history.

(56) References Cited

U.S. PATENT DOCUMENTS 5,166,926 A * 11/1992 Cisneros et al. ............. 370/392
2008/0299987 A1 12/2008 Iyer et al.
2010/0124254 A1 * 5/2010 Wu et al. ..................... 375/131
2010/0232380 A1 9/2010 Choi et al.
2011/0032892 A1 * 2/2011 Bahl et al. .................... 370/329
2011/0080882 A1 * 4/2011 Shu et al. ...................... 370/329
2011/0090853 A1 * 4/2011 Chandramouli et al. ..... 370/329
2011/0090890 A1 * 4/2011 Seok et al. .................... 370/338
2011/0143761 A1 * 6/2011 Uusitalo et al. .............. 455/450

(Continued)

FOREIGN PATENT DOCUMENTS

WO 2010097722 A1 2/2010
WO WO 2010/071338 A2 6/2010

OTHER PUBLICATIONS

PCT/US11/ 29437 International Search Report and Written Opinion mailed Mar. 22, 2011.
Cordeiro et al., "Spectrum Sensing for Dynamic Spectrum Access of TV Bands", 2nd International Conference on Cognitive Radio Oriented Wireless Networks and Communications 2007 (CrownCom2007), Aug. 1-3, 2007.

(Continued)

*Primary Examiner* — Robert Scheibel
*Assistant Examiner* — Ajay Cattungal
(74) *Attorney, Agent, or Firm* — Turk IP Law, LLC

(57) ABSTRACT

Technologies are generally described for quiet period management in secondary opportunistic networks. Access Points (APs) in close proximity may form an ad hoc network (e.g., IEEE 802.11af) and instead of sensing and detecting idle channels in TV white spaces, listen to the broadcast messages from a co-existence manager, which broadcasts periodic intraframe sensing (IRFS) and interframe sensing (IFS) information in Medium Access Control (MAC) packets. The APs may extract information regarding the operating channels of the active cognitive base stations and their scheduled IRFS and IFSs on these channels. According to one scheme, short IRFS intervals over active channels may be allocated in a dedicated manner using a unique access request packet (ARP) by emergency network APs. According to another scheme, contention-based access may be provided to longer IFS intervals on multiple channels.

34 Claims, 9 Drawing Sheets

(56) References Cited

U.S. PATENT DOCUMENTS

2011/0187591 A1* 8/2011 Walker, Sr. ............... 342/357.29
2011/0306375 A1* 12/2011 Chandra et al. ............... 455/509
2012/0093092 A1* 4/2012 Kasslin et al. ................ 370/329
2012/0149420 A1* 6/2012 Naden et al. .................. 455/517

OTHER PUBLICATIONS

Song et al., "Sensing with Active Cognitive Systems", IEEE Transactions on Wireless Comunicat'ions, vol. 9, No. 6, Jun. 2010 (The whole document).

* cited by examiner

QUIET PERIOD MANAGEMENT FOR EMERGENCY AD HOC NETWORKS IN TV WHITE SPACES

CROSS REFERENCE TO RELATED APPLICATIONS

This application claims the benefit of International Patent Application Serial No. PCT/US11/29347 filed on Mar. 22, 2011. The disclosures of the International Patent Application are hereby incorporated by reference for all purposes.

BACKGROUND

Unless otherwise indicated herein, the materials described in this section are not prior art to the claims in this application and are not admitted to be prior art by inclusion in this section.

With the gradual transition to digital television (DTV) as well as development of efficient audio and video compression techniques, considerable amount of unused channels have been generated in the TV spectrum (VHF and UHF bands) collectively known as TV White Spaces (TVWS). TV white spaces are location and time dependent (based on active TV broadcast stations in an area and when those stations broadcast).

On the other hand, wireless technologies are proliferating in all aspects of personal, commercial, and other use. From home computer networks (e.g., Wireless Local Area Networks "WLANs") to wireless sensor networks, Wireless Regional Area Networks (WRANs), an increasingly large number of devices and systems utilize and have a need for wireless spectrum. Because the radio frequency (RF) spectrum is inherently limited, attempts to increase efficiency of wireless communications include various sharing schemes for existing dedicated portions of the RF spectrum. For example, standardization activities targeting TVWS include IEEE 802.22 for WRANs, IEEE 802.11af for personal/portable devices resulting in ad hoc networks, and IEEE 802.19.1 Task Groups (TGs) work on supporting coexistence in TVWS.

The present disclosure appreciates that there are several limitations with existing spectrum sharing technologies, specifically directed to TVWS. For example, it is a challenging task to detect these white spaces, which are in-deterministic over time and space, for possible usage by opportunistic secondary user networks.

SUMMARY

According to some examples, the present disclosure describes a method for quiet period management in secondary networks. The method may include receiving intraframe sensing (IRFS) and interframe sensing (IFS) information from a co-existence manager; allocating an IRFS interval for dedicated access over an active channel between an access point (AP) and a component based on the received information; and allocating an IFS interval for contentious access over a plurality of channels between a plurality of APs and corresponding components based on the received information.

According to other examples, the present disclosure describes a coexisting wireless network access point capable of operating in quiet periods of another secondary user network. The access point may include a wireless communication module, a memory configured to store instructions, and a processor coupled to the memory. The processor may receive intraframe sensing (IRFS) and interframe sensing (IFS) information from a co-existence manager, broadcast an intention of data transmission during an IRFS interval employing a unique access request packet (ARP), and receive dedicated access over an active channel to communicate with a component based on the received information if a timestamp included in the ARP is the smallest among broadcast timestamps.

According to yet other examples, the present disclosure describes a coexisting emergency ad hoc wireless network capable of operating in quiet periods of a secondary user network. The network may include a coexistence manager adapted to detect intraframe sensing (IRFS) and interframe sensing (IFS) information from broadcasts by one or more cognitive base stations of at least one Wireless Regional Area Network (WRAN) using TV White Spaces as secondary users and transmit the IRFS and IFS information to a plurality of access points (APs) of coexisting emergency ad hoc networks. The network may also include an AP of a coexisting emergency ad hoc network adapted to receive the IRFS and IFS information from the co-existence manager and broadcast an intention of data transmission during an IRFS interval employing a unique access request packet (ARP).

According to further examples, the present disclosure describes a computer-readable storage medium having instructions stored thereon for a method of quiet period management in secondary networks. The method defined by the instructions may include receiving intraframe sensing (IRFS) and interframe sensing (IFS) information from a co-existence manager; detecting one or more access points (APs) broadcast of their intention of data transmission during an IRFS interval; and allocating an IRFS interval for dedicated access over an active channel between an AP and a component based on the received IRFS information and one or more parameters in the APs broadcast.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
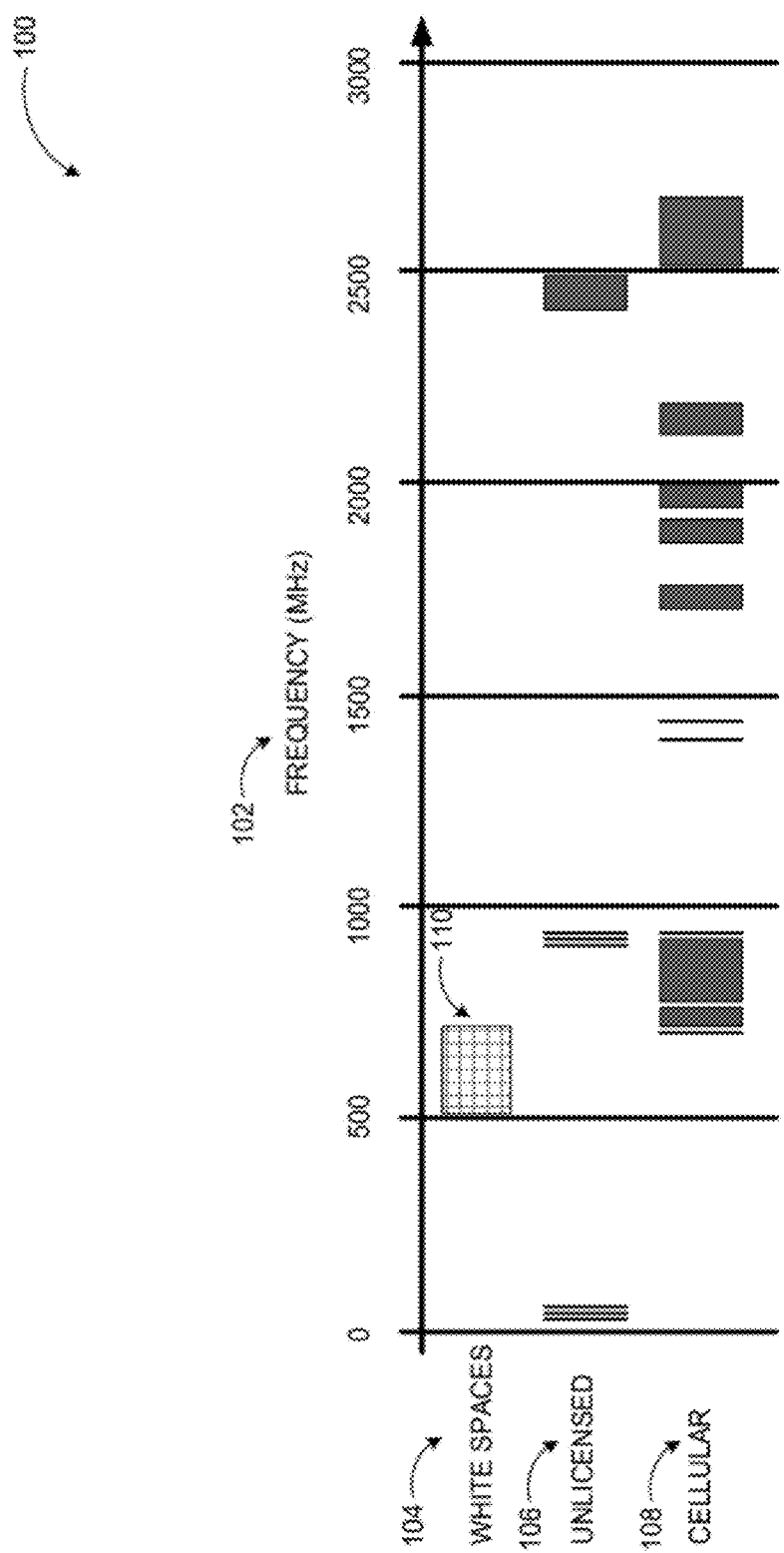
FIG. 1 is a diagram of an illustrative example of white spaces that may be used for coexisting secondary wireless networks.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to quiet period management for emergency ad hoc networks in TV white spaces.

Briefly stated, Access Points (APs) in close proximity may form an ad hoc network (e.g., IEEE 802.11af) and instead of sensing and detecting idle channels in TV white spaces, listen to the broadcast messages from a co-existence manager, which broadcasts periodic intraframe sensing (IRFS) and interframe sensing (IFS) information in Medium Access Control (MAC) packets. The APs may extract information regarding the operating channels of the active cognitive base stations and their scheduled IRFS and IFSs on these channels. According to one scheme, short IRFS intervals over active channels may be allocated in a dedicated manner using a unique access request packet (ARP) by emergency network APs. According to another scheme, contention-based access may be provided to longer IFS intervals on multiple channels.

FIG. 1 is a diagram of an illustrative example of white spaces that may be used for coexisting secondary wireless networks in accordance with at least some embodiments described herein. Radio spectrum typically refers to the full frequency range from 3 kHz to 300 GHz that may be used for wireless communication. Access to most of the spectrum is commonly regulated by national and international agencies specifying rules and regulations for transmitters to abide by in order to avoid misuse of the spectrum such as interference with legitimate users. Portions of the spectrum (e.g. 108) are dedicated to "licensed" users such as radio/TV broadcasters or cellular phone networks, where a particular frequency band is solely dedicated to the use of a single or group of transmitters. As shown in the frequency spectrum 102 of Diagram 100, distinct bands of frequencies are dedicated to licensed users. For example, various digital cellular technologies, including Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN) may use different frequency bands depending on location (e.g., country regulations). In addition, sub-bands may be dedicated to individual licensed users such as sub-bands of the TV band being dedicated to individual licensed stations.

Other portions (e.g. 106) of the spectrum are dedicated to "unlicensed" users, where individual entities do not have exclusive use of a frequency band, but anyone with a compliant transmitter device may utilize the band. Interference in unlicensed bands is typically reduced or prevented by regulations for characteristics of devices that use the band.

A recent development in technology is the transition to digital television (DTV), which opened up a number of spectrum portions previously used by analog TV broadcasting. Development of efficient audio and video compression techniques along with the DTV technology resulted in considerable amount of unused channels in the TV spectrum (VHF and UHF bands) being referred to as TV White Spaces (TVWS) 110. Because TV stations vary from one locale to another and their broadcast times are in some cases less than 24 hours a day, TV white spaces are location and time dependent. While white spaces 104 exist in other portions of the frequency spectrum 102 as well, current transmitter/receiver technologies make the TVWS 110 especially attractive for shared spectrum usage.

With the proliferation of wireless communication technologies and ever increasing need to additional spectrum for such technologies, attempts to increase efficiency of wireless communications include various sharing schemes for existing dedicated portions of the RF spectrum. Examples of spectrum sharing attempts in TV white spaces include IEEE 802.22 for WRANs, IEEE 802.11af for personal/portable devices resulting in ad hoc networks, and IEEE 802.19.1 Task Groups (TGs) work on supporting coexistence in TVWS.

Figure 2:
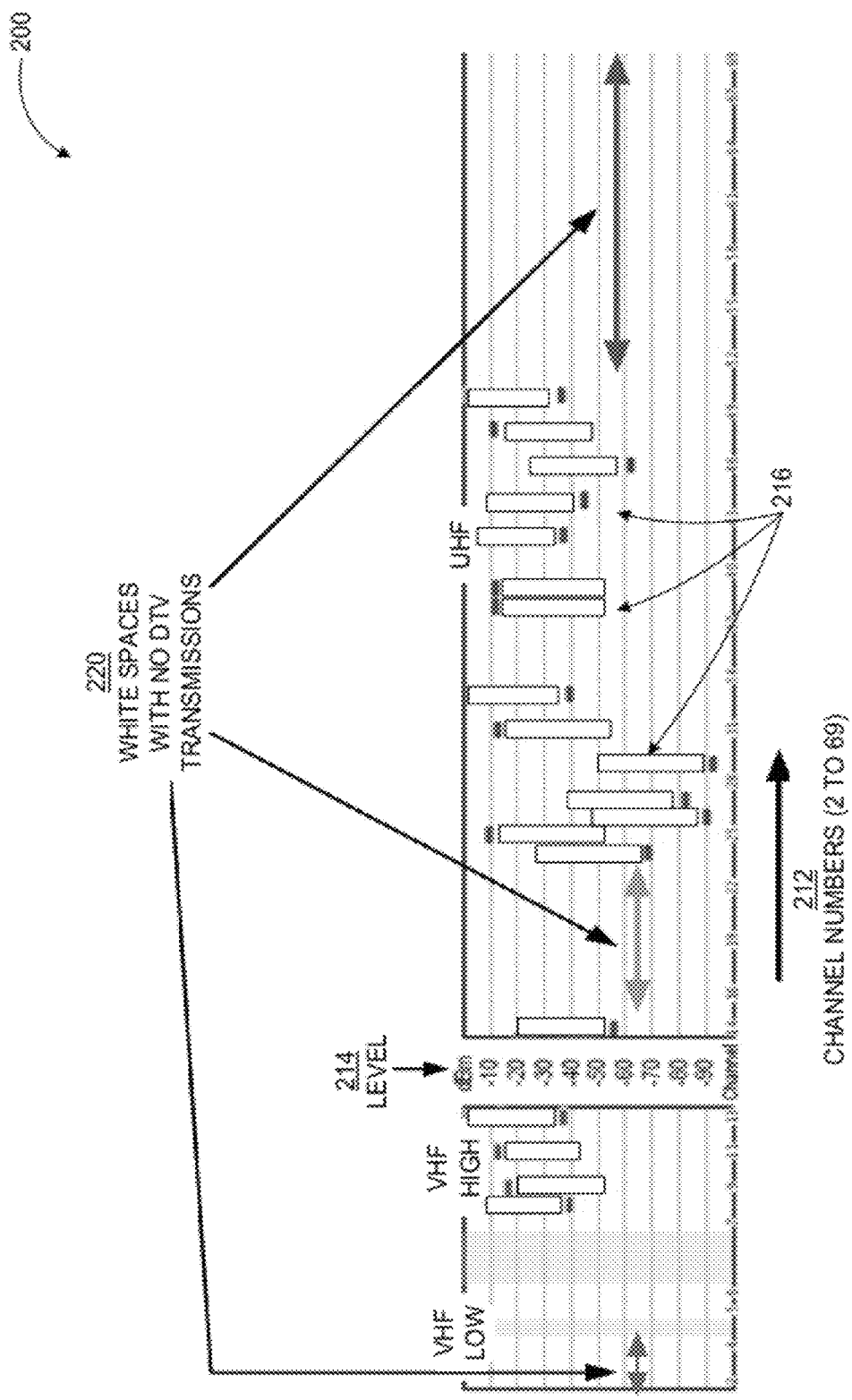
FIG. 2 illustrates example white spaces for a particular location in television (TV) spectra and representative signal strengths.

FIG. 2 illustrates example white spaces for a particular location in television (TV) spectra and representative signal strengths. Diagram 200 illustrates licensed users 216 in the VHF and UHF bands across TV channel numbers 212 and their respective signal levels 214 in dBm. Signal levels for various licensed users may also be defined by a regulatory agency.

The spectrum usage scenario is a snapshot of the spectrum at the ZIP code 98195 over channels 2 to 60 at 10.50 am on Mar. 3, 2010. As mentioned above, the spectrum usage by licensed users may vary depending on location (licensed stations) and time (actually broadcasting stations). In the example snapshot, the available white spaces 220 (where there is no DTV transmission) are between channels 2-4, 15-23, and 51-69.

Secondary opportunistic networks may take advantage of the white spaces 220 as long as they do not interfere with licensed users of the band. That means, the secondary users need to determine when and at what frequency the primary users are active and avoid those frequencies. IEEE 802.22 is an example standard for Wireless Regional Area Network (WRAN) using white spaces in the TV frequency spectrum. The standard is aimed at using cognitive radio technologies to allow sharing of geographically unused spectrum allocated to the Television Broadcast Service, on a non-interfering basis.

Non-interfering secondary use of the white spaces is not limited to 802.22 networks. While some networks like IEEE 802.22 WRANs utilize carrier sensing and employ quiet periods, embodiments are directed to other forms of secondary networks that can utilize information from another secondary network (such as an IEEE 802.22 WRAN) instead of sensing the spectrum or employing quiet periods, which add to the overhead of the network operation. An example of a network, where embodiments may be implemented is an IEEE 802.11af emergency service ad hoc network.

Figure 3:
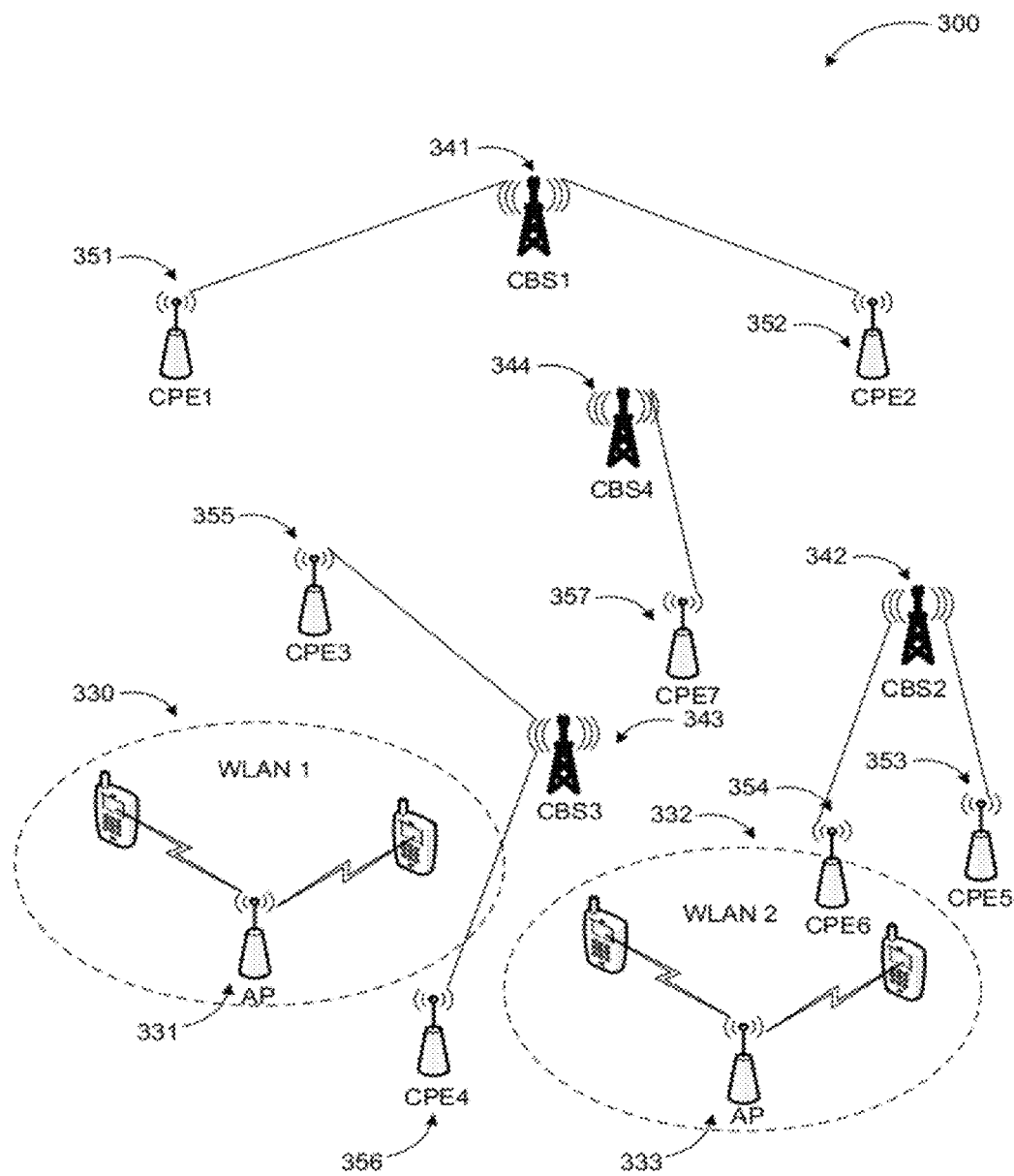
FIG. 3 illustrates coexisting wireless service providers and ad hoc secondary wireless networks, where quiet period management may be employed.

FIG. 3 illustrates coexisting wireless service providers and ad hoc secondary wireless networks, where quiet period management may be employed in accordance with at least some embodiments described herein. Standards such as IEEE 802.22 define spectrum sensing intervals (also known as quiet periods "QPs") in order to operate efficiently in the TVWS. Quiet periods are indispensible for some secondary networks in order to perform spectrum sensing effectively and detect white spaces.

The IEEE 802.22 standard defines explicit QPs in two stages: intra-frame sensing (IRFS) followed by an inter-frame sensing (IFS). An IRFS is of short duration, typically in tens of ms, while an IFS is of long duration ranging from about 10 to about 50 ms. According to this standard, a cognitive base station (CBS) may schedule multiple IRFS for in-band sensing (the channel currently being used by the CBS) over multiple frames in a superframe. Based on the cumulative report from the received IRFSs on channel status (busy or idle), the CBS may schedule an IFS spanning multiple consecutive frames. An entire IEEE 802.22 network terminates data transmission during the IRFSs and an IFS.

Diagram 300 shows multiple wireless service providers (WSPs) using a secondary opportunistic network such as IEEE 802.22. Each WSP includes a CBS (e.g., 341, 342, 343, and 344) and users, also known as consumer premise equipment (CPE) (e.g., 351 through 357). Each CBS may communicate with its CPEs (e.g., CPE 343 communicating with CPEs 355 and 356) on a single channel and schedule the QPs (i.e., IRFS and IFS intervals) for spectrum sensing. The QP scheduling by multiple WSPs over several operating channels may lead to multiple long IFS durations, causing considerable wastage of bandwidth.

Figure 4:
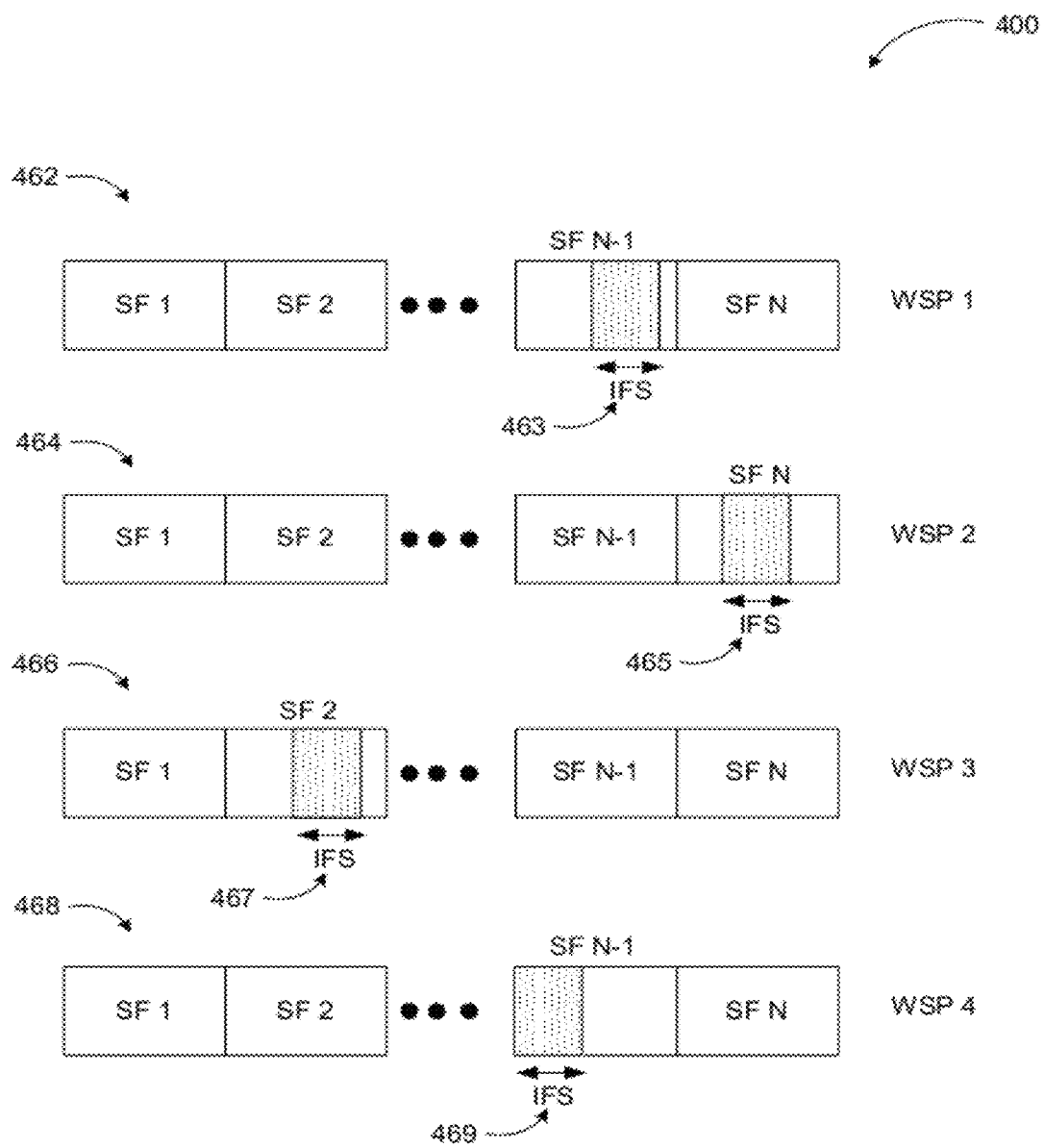
FIG. 4 illustrates interframe sensing schedules from different coexisting wireless service providers of FIG. 3.
Figure 5:
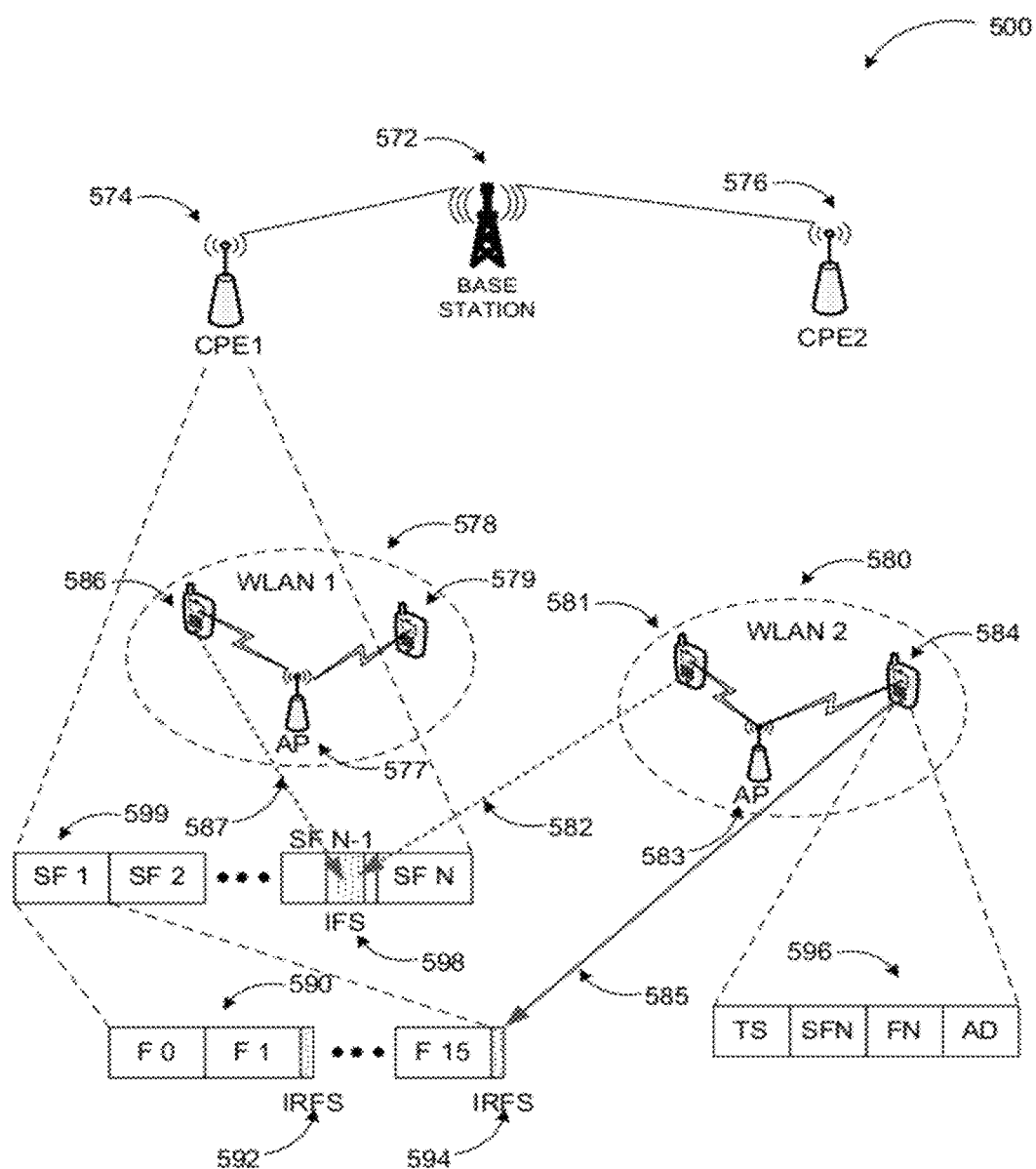
FIG. 5 illustrates heterogeneous coexistence between wireless regional area networks and ad hoc wireless networks with contentious IFS access and dedicated IRFS access using access request packets.

Each CBS may schedule multiple IRFS for in-band sensing (the channel currently being used by the CBS) over multiple frames in a superframe (for example, frames 1 through 15 of superframe 599 in FIG. 5). Based on the cumulative report from the received IRFSs on channel status (busy or idle), the CBS may schedule an IFS spanning multiple consecutive frames (for example, frames in superframe (N−1) indicated by reference numeral 462 in FIG. 4).

Networks 330 and 332 are example networks according to at least some embodiments that include APs 331 and 333 along with a plurality of user equipment. In case of emergency ad hoc networks, APs near each other may form an ad hoc network such as an IEEE 802.11af network and operate in the TVWS. The APs, instead of sensing and detecting idle channels, may listen to the broadcast messages from a coexistence manager (CM) of an IEEE 802.19.1 coexistence network. The APs (331, 333) may extract information from the CM regarding the operating channels of the active CBSs and their scheduled IRFS and IFSs on these channels. Two different schemes may be employed for IRFS and IFS access. First, a dedicated allocation of short IRFS intervals over active channels may be utilized through a unique access request packet (ARP) by emergency network APs. Second, a contention-based access of long IFS intervals on multiple channels may be utilized by the ad hoc network.

It should be noted that this contentious or dedicated access of IRFS and IFS intervals cannot interfere with nearby primary user signals, since these QPs are scheduled in channels of TVWS currently not occupied by primary users while being opportunistically utilized by secondary networks.

FIG. 4 illustrates interframe sensing schedules from different coexisting wireless service providers of FIG. 3 in accordance with at least some embodiments described herein. The superframe control header (SCH) in medium access control (MAC) packets from the CBS possesses explicit information of IRFS and IFS intervals such as time to quiet period (TTQP) and duration to quiet period (DQP) for IFS and IRFS cycle length, IRFS cycle offset, IRFS cycle frame bitmap, and IRFS duration for IRFSs. The SCH information may be updated by the operating CBSs of WSPs at a centralized coexistence manager (CM) (e.g., of an IEEE 802.19.1 coexistence network). The updating of IRFS and IFS intervals may be made mandatory before the initiation of the data transmission phase between CBSs and their corresponding CPEs. Then, the CM may broadcast periodic updates about the QPs to multiple IEEE 802.11af APs facilitating efficient data transmissions of ad hoc networks based on IEEE 802.11af or similar standard and enhancing the overall licensed spectrum utilization.

Diagram 400 illustrates example IFS intervals ranging over multiple frames in a superframe. For example, in the transmission for WSP 1 of FIG. 3 (462), the IFS interval 463 is in superframe N−1. In the transmission for WSP 2 of FIG. 3 (464), the IFS interval 465 is in superframe N. In the transmission for WSP 3 of FIG. 3 (466), the IFS interval 467 is in superframe 2. Finally, in the transmission for WSP 4 of FIG. 3 (468), the IFS interval 469 is in superframe N−1 again, but over different frames compared to the transmission for WSP 1.

FIG. 5 illustrates heterogeneous coexistence between wireless regional area networks and ad hoc wireless networks with contentious IFS access and dedicated IRFS access using access request packets in accordance with at least some embodiments described herein. Diagram 500 illustrates a base station 572 communicating with CPEs 574 and 576 employing QPs in TVWS. Two example ad hoc networks 578, 580 according to embodiments may take advantage of the QPs to facilitate communications between APs 577, 583 and respective users 586, 579 and 581, 584.

As discussed above, the interframe sensing details are specified in the superframe control header (SCH) according to the IEEE 802.22 standard. The field "time to quiet period (TTQP)" of 12 bits indicates the time span between the transmission of this SCH information and the next scheduled quiet period for IRFS. The 8 leftmost bits specify the superframe number while the four rightmost bits indicate the frame number that initiates the IRFS. Moreover, the duration of the scheduled IFS is indicated in the "duration to quiet period (DQP)" field in the SCH. The information in DQP hints upon the number of frames in a superframe, starting from the frame indicated in TTQP, which may be used for IFS. Similarly, the IRFS information is specified in the following fields in SCH: IRFS cycle length, IRFS cycle offset, IRFS cycle frame bitmap, and IRFS duration. Typical values of IRFS interval is about 5 ms while IFS duration lasts from about 25 to about 50 ms.

The SCH information may be shared by the IEEE 802.22 CBSs with APs in ad hoc IEEE 802.11af networks within their respective transmission ranges through the Coexistence Manager (CM) in a system according to embodiments. This implies that the location and duration of IRFS and IFS are known at the APs in the IEEE 802.11af networks. These QPs, short IRFS and long IFS durations, may be utilized for short bursts of data transmissions among the contending APs. Two communication paradigms are proposed during the QPs according to some embodiments. One of the paradigms is the contentious access during long IFS intervals and the other is the dedicated access during IRFS intervals. Because IEEE 802.22 users (CPEs and the CBS) do not involve in data transmission during the QPs, coexistence of IEEE 802.11af APs is more of interference avoidance type. Therefore, these QPs may be suited for emergency service networks with applications of short durations and high Quality of Service (QoS) requirements such as multimedia or streaming video and audio applications for the coexisting ad hoc networks.

Dedicated access may be allowed during IRFS intervals to those APs with time critical high quality applications with small transmission durations. In order to avoid mutual interference between in-network WLAN users, the APs may be required to broadcast their intention of data transmission in such IRFS slots. The time stamp on the ARP may be instrumental in deciding access to a specific IRFS interval as shown in Diagram 500. A user with the smallest time stamp (i.e., first intended user) may gain dedicated access to each IRFS interval. The ARP 596 may have the following frame structure: Time stamp (TS) may include the time for the ARP creation; superframe number (SFN) may specify the channel and superframe number for desired access; frame number (FN) may specify the frame number in the superframe defined in the SFN field of the ARP packet; and access duration (AD) may include information on the duration of access by the requesting AP. Based on the AD field, a requesting AP with the second smallest time stamp on the same frame in the superframe may access the IRFS if the requested access duration is less than the IRFS interval. Contention among the WLAN users may be valid only during long IFS intervals. Access to such intervals may be according to the traditional carrier sense multiple access-collision avoidance (CSMA-CA) approaches such as those defined in IEEE 802.11 a/b/g WLAN standards.

In the example scenario of diagram 500, superframe 599 is shown having frames 1 through 15 (590) with IRFS intervals 592 and 594 in frames 1 and 15, respectively. IRFS interval 594 may be used for dedicated access 585 by user 584 for communicating with AP 583, while IFS 598 of superframe N−1 is subject to contentious access attempts 582 and 587 by users 581 and 586, respectively.

While embodiments have been discussed above using specific examples, components, scenarios, and configurations in FIG. 1 through FIG. 5, they are intended to provide a general guideline to be used for quiet period management for emergency ad hoc networks in TV white spaces. These examples do not constitute a limitation on the embodiments, which may be implements using other components, maximization schemes, and configurations using the principles described herein. Furthermore, the specific standards such as IEEE 802.22 or IEEE 802.11af are also for illustration purposes and do not impose a limitation on embodiments. A secondary opportunistic network according to embodiments may conform to any standard (or proprietary scheme) using the principles described herein.

Figure 6:
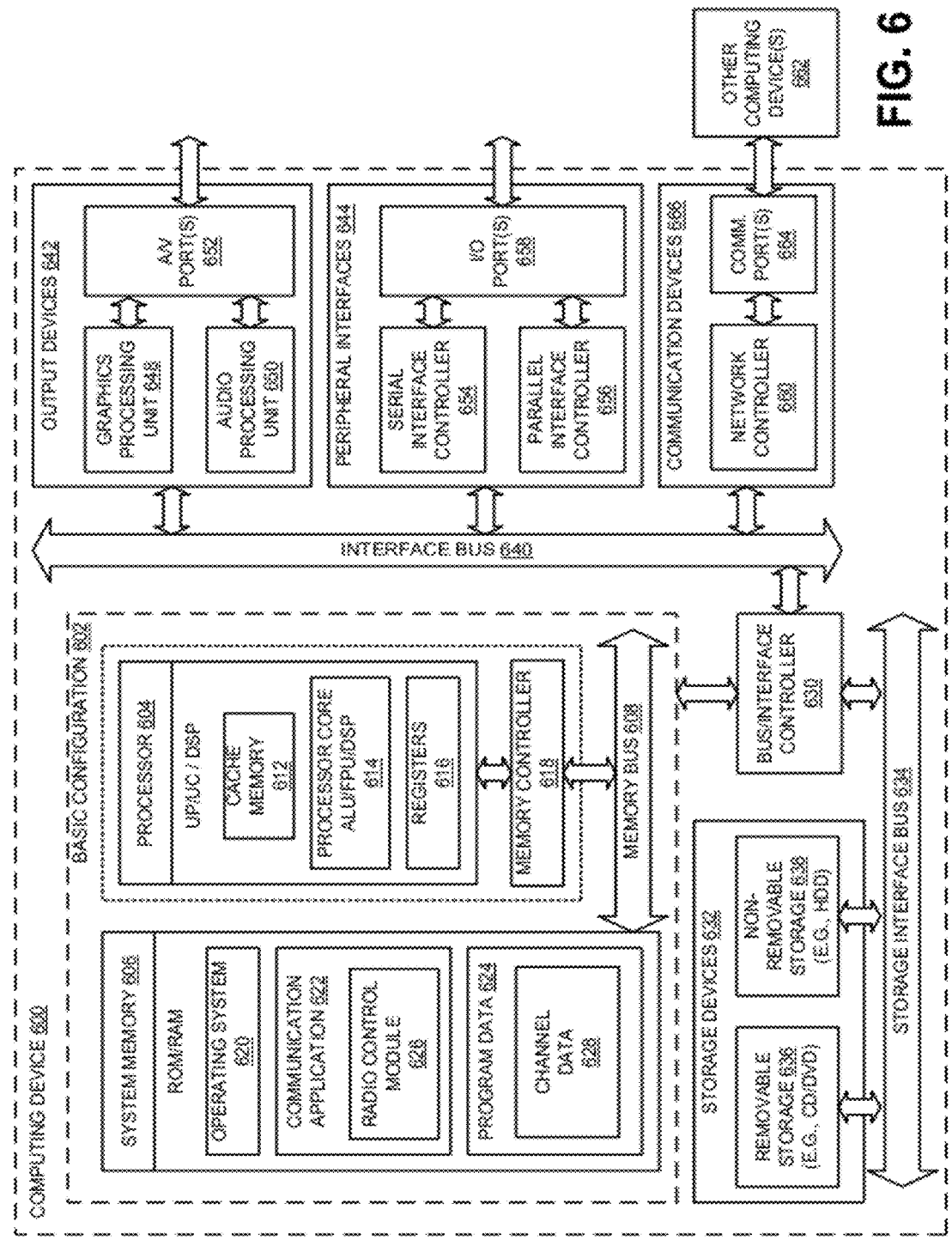
FIG. 6 illustrates a general purpose computing device, which may be used to implement quiet period management for emergency ad hoc networks in white spaces.

FIG. 6 illustrates a general purpose computing device, which may be used to implement quiet period management for emergency ad hoc networks in white spaces in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level cache memory 612, a processor core 614, and registers 616. Example processor core 614 may include an arithmetic logic unit (ALU), a floating point unit (FPU), a digital signal processing core (DSP Core), or any combination thereof. An example memory controller 618 may also be used with processor 604, or in some implementations memory controller 615 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more communication applications 622, and program data 624. Communication application 622 may include a radio control module 626 that is arranged to control a radio of an access point to utilize IFS and IRFS periods in TV white spaces for dedicated and contentious access by secondary networks as discussed above. Program data 624 may include one or more of channel data 628 (e.g. frequencies of available channels, etc.) and similar data as discussed above in conjunction with at least FIG. 1 through 5. This data may be useful for allocating available IFS and IRFS periods as is described herein. In some embodiments, communication application 622 may be arranged to operate with program data 624 on operating system 620 such that quiet periods in TV white spaces are managed for emergency ad hoc networks as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 666 to basic configuration 602 via bus/interface controller 630. Example output devices 642 include a graphics processing unit 648 and an audio processing unit 650, which may be configured to communicate to various external devices such as a display or speakers via one or more AN ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 666 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a physical server, virtual server, a computing cloud, or a hybrid device that include any of the above functions. Computing device 600 may also be implemented as a personal computer including both laptop computer and non-laptop computer configurations. Moreover computing device 600 may be implemented as a networked system or as part of a general purpose or specialized server.

Networks for a networked system including computing device 600 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 7:
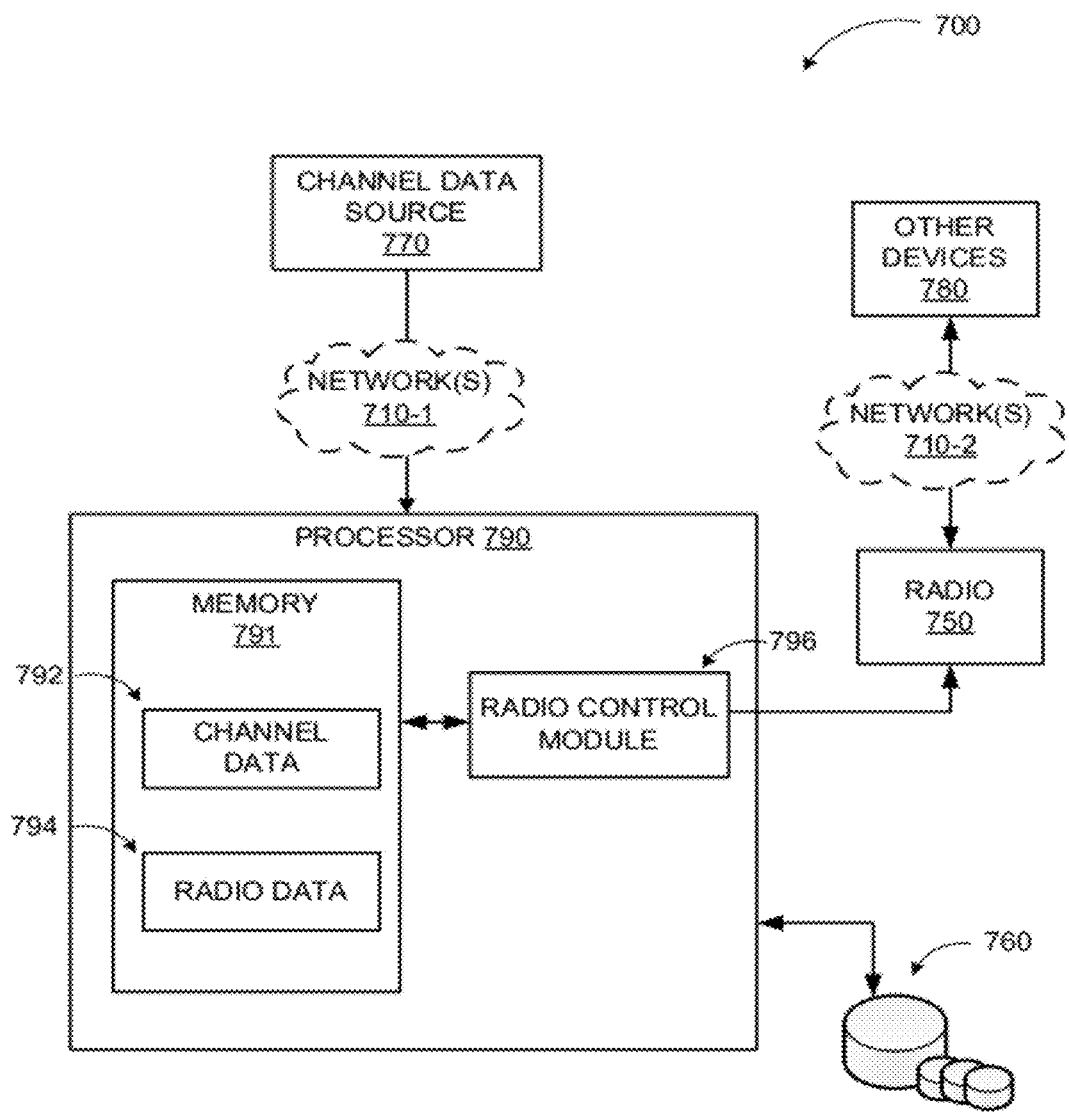
FIG. 7 illustrates a special purpose processor, which may be used to implement quiet period management for emergency ad hoc networks in white spaces.

FIG. 7 illustrates a special purpose processor, which may be used to implement quiet period management for emergency ad hoc networks in white spaces in accordance with at least some embodiments described herein. Processor 790 in diagram 700 may be part of a computing device that is communicatively coupled to radio 750, which may facilitate communication with other wireless devices 780 through network(s) 710-2 or may be integrated into radio 750. Processor 790 may also communicate with data source 770 storing channel information via network(s) 710-1. Processor 790 and radio 750 may be part of an access point in an emergency ad hoc network utilizing TV white spaces as a secondary opportunistic network.

Processor 790 may include a number of processing modules such as radio control module 796. Channel data 792 retrieved from channel data source 770 via network(s) 710-1 may be provided to radio control module 796 for determining a channel to scan or to switch to, as well as timing data associated with quiet periods, IFS and IRFS periods. Radio data 794 may include information associated with operational controls of the radio 750. Channel data 792 and radio data 794 may be stored during processing in memory 791, which may be a cache memory of the processor 790 or in an external memory (e.g., memory external to processor 790). Processor 790 may also be communicatively coupled to data stores 760, where at least some of the data may be stored during or following the control of radio 750.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 8:
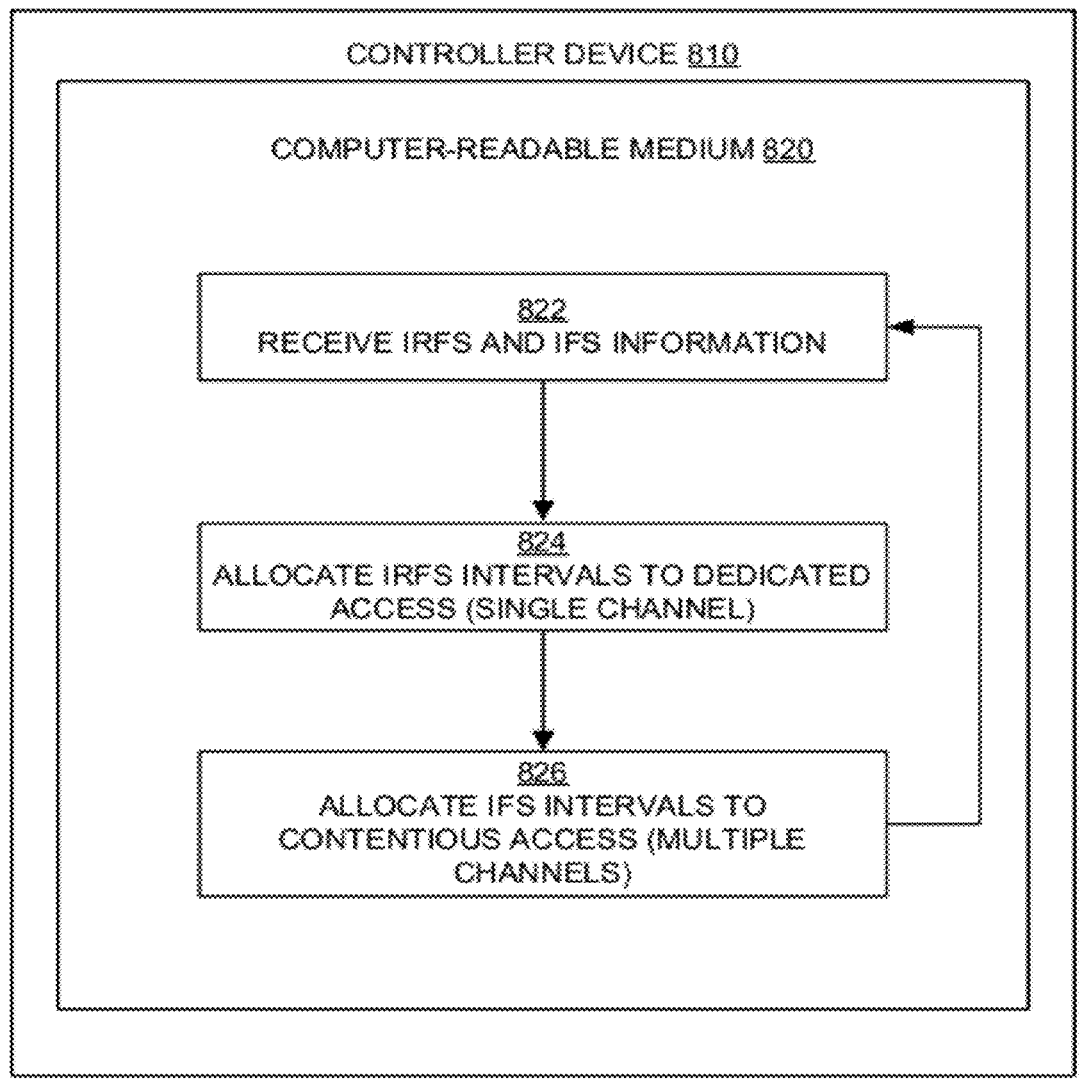
FIG. 8 is a flow diagram illustrating an example method for employing quiet period management for emergency ad hoc networks in white spaces that may be performed by a computing device such as device 600 in FIG. 6 or a special purpose processor such as processor 790 of FIG. 7.

FIG. 8 is a flow diagram illustrating an example method for employing quiet period management for emergency ad hoc networks in white spaces that may be performed by a computing device such as device 600 in FIG. 6 or a special purpose processor such as processor 790 of FIG. 7, in accordance with at least some embodiments described herein. Thus, controller device 810 may be processor 790 of FIG. 7 or computing device 600 of FIG. 6. Computer-readable medium 820 may store instructions associated with the example method to be executed by the controller device 810.

An example process according to embodiments may begin with operation 822, "RECEIVE IRFS AND IFS INFORMATION", where an access point such as AP 585 of FIG. 5 receives updated intraframe sensing (IRFS) and interframe sensing (IFS) information from a co-existence manager of a secondary network.

Operations 822 may be followed by operation 824, "ALLOCATE IRFS INTERVALS TO DEDICATED ACCESS (SINGLE CHANNEL)", where the shorter IRFS intervals are allocated for dedicated access over an active channel between an AP and a component based on the received information in the ad hoc emergency service network. The allocation may be performed by a co-existence manager or through an agreement among the APs of the ad hoc network.

Operations 824 may be followed by operation 826, "ALLOCATE IFS INTERVALS TO CONTENTIOUS ACCESS (MULTIPLE CHANNELS)", where the longer IFS intervals are allocated for contentious access over a plurality of channels between a plurality of APs and corresponding components based on the received information in the ad hoc emergency service network. The allocation may be performed by a co-existence manager or through an agreement among the APs of the ad hoc network.

The operations included in the process of FIG. 8 described above are for illustration purposes. Quiet period management for emergency ad hoc networks in white spaces may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 9:
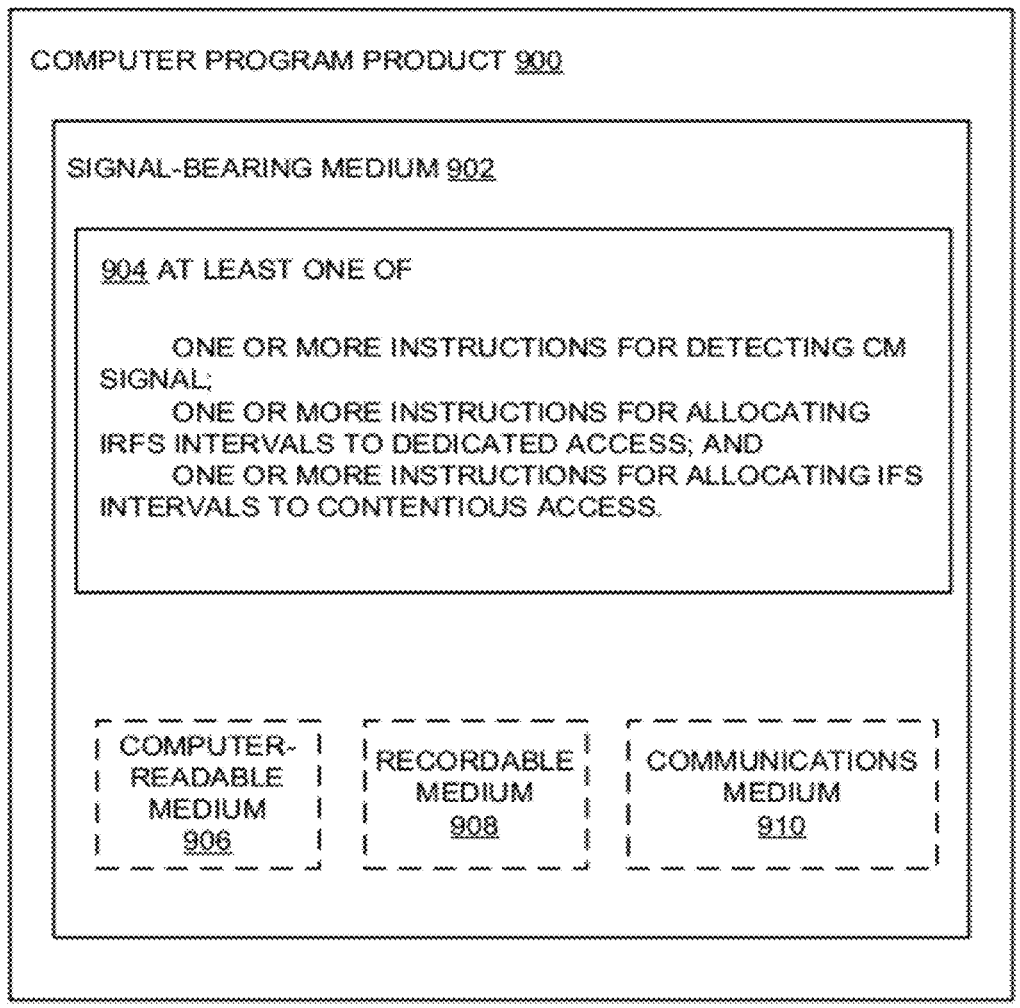
FIG. 9 illustrates a block diagram of an example computer program product, all arranged in accordance with at least some embodiments described herein.

FIG. 9 illustrates a block diagram of an example computer program product, arranged in accordance with at least some embodiments described herein. In some examples, as shown in FIG. 9, computer program product 900 may include a signal bearing medium 902 that may also include machine readable instructions 904 that, when executed by, for example, a processor, may provide the functionality described above with respect to FIG. 3 through FIG. 5. Thus, for example, referring to processor 790, one or more of the tasks shown in FIG. 9 may be undertaken in response to instructions 904 conveyed to the processor 790 by medium 902 to perform actions associated with quiet period management for emergency ad hoc networks in TV white spaces as described herein. Some of those instructions may include detecting a co-existence manager signal, allocating IRFS intervals to dedicated access, and allocating IFS intervals to contentious access through one or more algorithms as described previously.

In some implementations, signal bearing medium 902 depicted in FIG. 9 may encompass a computer-readable medium 906, such as, but not limited to, a hard disk drive, a Compact Disc (CD), a Digital Versatile Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, computer program product 900 may be conveyed to the processor 904 by an RF signal bearing medium 902, where the signal bearing medium 902 is conveyed by a wireless communications medium 910 (e.g., a wireless communications medium conforming with the IEEE 802.11 standard).

According to some examples, the present disclosure describes a method for quiet period management in secondary networks. The method may include receiving intraframe sensing (IRFS) and interframe sensing (IFS) information from a co-existence manager; allocating an IRFS interval for dedicated access over an active channel between an access point (AP) and a component based on the received information; and allocating an IFS interval for contentious access over a plurality of channels between a plurality of APs and corresponding components based on the received information.

According to other examples, the method may further include causing each AP to broadcast its intention of data transmission during an IRFS interval and/or employing a unique access request packet (ARP) for communicating access information from each AP to the corresponding component. The ARP may include at least one from a set of: a time stamp indicating a time of ARP creation, a superframe number specifying a channel and a superframe number for desired access, a frame number specifying a frame within a superframe defined by the superframe number, and an access duration defining a duration of access desired by a broadcasting AP.

According to further examples, the method may also include enabling dedicated access to an available channel to a requesting AP with a smallest time stamp on the same frame in the superframe during the IRFS and/or enabling access to an available channel to a requesting AP with a second smallest time stamp on the same frame in the superframe during the IRFS if the access duration in the ARP is less than the IRFS interval. The channels may be within Television White Spaces.

The IRFS and IFS information may be detected from a broadcast by a cognitive base station of a Wireless Regional Area Network (WRAN) and transmitted by the coexistence manager to a plurality of APs in one or more coexisting wireless networks. The method may also include forming an ad hoc wireless network by two or more APs prior to using an available channel. The ad hoc wireless network may be an emergency ad hoc network. The method may further include transmitting one of multimedia, streaming video, and/or streaming audio data using an available channel.

According to other examples, the present disclosure describes a coexisting wireless network access point capable of operating in quiet periods of another wireless network. The access point may include a wireless communication module, a memory configured to store instructions, and a processor coupled to the memory. The processor may receive intraframe sensing (IRFS) and interframe sensing (IFS) information from a co-existence manager, broadcast an intention of data transmission during an IRFS interval employing a unique access request packet (ARP), and receive dedicated access over an active channel to communicate with a component based on the received information if a timestamp included in the ARP is the smallest among broadcast timestamps.

The ARP includes at least one from a set of: a time stamp indicating a time of ARP creation, a superframe number specifying a channel and a superframe number for desired access, a frame number specifying a frame within a superframe defined by the superframe number, and an access duration defining a duration of access desired by a broadcasting AP. According to some examples, the processor may also form an ad hoc wireless network with one or more APs prior to using an available channel and/or exchange one of multimedia, streaming video, and/or streaming audio data with one or more components using the active channel.

According to further examples, the processor may also receive periodic updates on the IRFS and IFS information from the coexistence manager. The IRFS and IFS information may be detected by the coexistence manager from broadcasts by one or more cognitive base stations of at least one Wireless Regional Area Network (WRAN) using TV White Spaces as secondary users. The access point may be part of an IEEE 802.11af wireless network. The coexistence manager may be part of an IEEE 802.19.1 wireless coexistence network.

According to yet other examples, the present disclosure describes an emergency ad hoc wireless network capable of operating in quiet periods of another coexisting wireless network. The network may include a coexistence manager adapted to detect intraframe sensing (IRFS) and interframe sensing (IFS) information from broadcasts by one or more cognitive base stations of at least one Wireless Regional Area Network (WRAN) using TV White Spaces as secondary users and transmit the IRFS and IFS information to a plurality of access points (APs) of coexisting emergency ad hoc networks. The network may also include an AP of a coexisting emergency ad hoc network adapted to receive the IRFS and IFS information from the co-existence manager and broadcast an intention of data transmission during an IRFS interval employing a unique access request packet (ARP).

According to some examples, the coexistence manager may allocate an IRFS interval for dedicated access over an active channel to the AP based on the IRFS information and the ARP; and allocate an IFS interval for contentious access over a plurality of channels between a plurality of components based on the IFS information and the broadcast ARPs. The ARP may include at least one from a set of: a time stamp indicating a time of ARP creation, a superframe number specifying a channel and a superframe number for desired access, a frame number specifying a frame within a superframe defined by the superframe number, and an access duration defining a duration of access desired by a broadcasting AP.

The coexistence manager may also enable dedicated access to the active channel to the AP if the time stamp in the ARP is a smallest timestamp on the same frame in the superframe during the IRFS. The IRFS interval may be less than about 10 ms and the IFS interval may be between about 10 ms and about 50 ms. The IRFS and IFS information may include at least one from a set of: a time to quiet period (TTQP), a duration to quiet period (DQP) for IFS and IRFS intervals, an IRFS cycle offset, an IRFS cycle frame bitmap, and/or an IRFS duration for IRFSs.

According to further examples, the present disclosure describes a computer-readable storage medium having instructions stored thereon for a method of quiet period management in secondary networks. The method defined by the instructions may include receiving intraframe sensing (IRFS) and interframe sensing (IFS) information from a co-existence manager; detecting one or more access points (APs) broadcast of their intention of data transmission during an IRFS interval; and allocating an IRFS interval for dedicated access over an active channel between an AP and a component based on the received IRFS information and one or more parameters in the APs broadcast.

In some examples, the method may include allocating an IFS interval for contentious access over a plurality of channels between a plurality of APs and corresponding components based on the received IFS information. The APs may broadcast their intention of data transmission employing a unique access request packet (ARP) that includes at least one from a set of: a time stamp indicating a time of ARP creation, a superframe number specifying a channel and a superframe number for desired access, a frame number specifying a frame within a superframe defined by the superframe number, and an access duration defining a duration of access desired by a broadcasting AP.

In other examples, the method may also include enabling dedicated access to the active channel to a requesting AP with a smallest time stamp on the same frame in the superframe during the IRFS and/or enabling access to the active channel to a requesting AP with a second smallest time stamp on the same frame in the superframe during the IRFS if the access duration in the ARP is less than the IRFS interval. The channels may be within Television White Spaces and the IRFS and IFS information may be detected from a broadcast by a cognitive base station of a Wireless Regional Area Network (WRAN). Two or more APs may form an ad hoc emergency wireless network for exchanging one of multimedia, streaming video, and/or streaming audio data over available channels. The method may further include broadcasting periodic updates on the IRFS and IFS information to the APs. Access to the active channel in an allocated IFS interval may be provided to a contending component employing multiple access collision avoidance.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for quiet period management in secondary networks, the method comprising:
   receiving intraframe sensing (IRFS) and interframe sensing (IFS) information from a co-existence manager;
   allocating an IRFS interval for dedicated access over an active channel between an access point (AP) and a component based on the received information;
   scheduling an IFS interval spanning multiple consecutive frames based on a cumulative report from the IRFS on a status of the active channel; and
   allocating the IFS interval for contentious access over a plurality of channels between a plurality of APs and corresponding components based on the received information.

2. The method according to claim 1, further comprising:
   causing each AP to broadcast its intention of data transmission during an IRFS interval.

3. The method according to claim 2, further comprising:
   employing a unique access request packet (ARP) for communicating access information from each AP to the corresponding component.

4. The method according to claim 3, wherein the ARP includes at least one from a set of: a time stamp indicating a time of ARP creation, a superframe number specifying a channel and a superframe number for desired access, a frame number specifying a frame within a superframe defined by the superframe number, and an access duration defining a duration of access desired by a broadcasting AP.

5. The method according to claim 4, further comprising:
   enabling dedicated access to an available channel to a requesting AP with a smallest time stamp on the same frame in the superframe during the IRFS.

6. The method according to claim 4, further comprising:
   if the access duration in the ARP is less than the IRFS interval, enabling access to an available channel to a requesting AP with a second smallest time stamp on the same frame in the superframe during the IRFS.

7. The method according to claim 1, wherein the channels are within Television White Spaces.

8. The method according to claim 1, wherein the IRFS and IFS information are detected from a broadcast by a cognitive base station of a Wireless Regional Area Network (WRAN).

9. The method according to claim 1, wherein the IRFS and IFS information is transmitted by the coexistence manager to a plurality of APs in one or more coexisting wireless networks.

10. The method according to claim 1, further comprising:
    forming an ad hoc wireless network by two or more APs prior to using an available channel.

11. The method according to claim 10, wherein the ad hoc wireless network is an emergency ad hoc network.

12. The method according to claim 1, further comprising:
    transmitting one of multimedia, streaming video, and/or streaming audio data using an available channel.

13. A coexisting wireless network access point capable of operating in quiet periods of another secondary user network, the access point comprising:
    a wireless communication module;
    a memory configured to store instructions; and
    a processor coupled to the memory, wherein the processor is adapted to execute the instructions, which when executed configure the processor to:
    receive intraframe sensing (IRFS) and interframe sensing (IFS) information from a co-existence manager;
    broadcast an intention of data transmission during an IRFS interval employing a unique access request packet (ARP);
    share the IRFS and IFS information within transmission ranges of at least one access point (AP); and
    if a timestamp included in the ARP is the smallest among broadcast timestamps, receive dedicated access over an active channel to communicate with a component based on the received information.

14. The access point according to claim 13, wherein the ARP includes at least one from a set of: a time stamp indicating a time of ARP creation, a superframe number specifying a channel and a superframe number for desired access, a frame number specifying a frame within a superframe defined by the superframe number, and an access duration defining a duration of access desired by the at least one broadcasting AP.

15. The access point according to claim 13, wherein the processor is further configured to:
    form an ad hoc wireless network with the at least one AP prior to using an available channel.

16. The access point according to claim 13, wherein the processor is further configured to:
    exchange one of multimedia, streaming video, and/or streaming audio data with one or more components using the active channel.

17. The access point according to claim 13, wherein the processor is further configured to:
    receive periodic updates on the IRFS and IFS information from the coexistence manager.

18. The access point according to claim 13, wherein the IRFS and IFS information are detected by the coexistence manager from broadcasts by one or more cognitive base stations of at least one Wireless Regional Area Network (WRAN) using TV White Spaces as secondary users.

19. The access point according to claim 13, wherein the access point is part of an IEEE 802.11af wireless network.

20. The access point according to claim 13, wherein the coexistence manager is part of an IEEE 802.19.1 wireless coexistence network.

21. A coexisting emergency ad hoc wireless network capable of operating in quiet periods of another wireless network, the network comprising:
    a coexistence manager adapted to:
    detect intraframe sensing (IRFS) and interframe sensing (IFS) information from broadcasts by one or more cognitive base stations of at least one Wireless Regional Area Network (WRAN) using TV White Spaces as secondary users;
    transmit the IRFS and IFS information to a plurality of access points (APs) of coexisting emergency ad hoc networks; and
    share the IRFS and IFS information within transmission ranges of the coexisting emergency ad hoc networks;
    an AP of a coexisting emergency ad hoc network adapted to:
    receive the IRFS and IFS information from the co-existence manager; and
    broadcast an intention of data transmission during an IRFS interval employing a unique access request packet (ARP).

22. The network according to claim 21, wherein the coexistence manager is further adapted to:
    allocate an IRFS interval for dedicated access over an active channel to the AP based on the IRFS information and the ARP; and allocate an IFS interval for contentious access over a plurality of channels between a plurality of components based on the IFS information and the broadcast ARPs.

23. The network according to claim 22, wherein the ARP includes at least one from a set of: a time stamp indicating a time of ARP creation, a superframe number specifying a channel and a superframe number for desired access, a frame number specifying a frame within a superframe defined by the superframe number, and an access duration defining a duration of access desired by a broadcasting AP.

24. The network according to claim 23, wherein the coexistence manager is further adapted to:
enable dedicated access to the active channel to the AP if the time stamp in the ARP is a smallest timestamp on the same frame in the superframe during the IRFS.

25. The network according to claim 22, wherein the IRFS interval is less than about 10 ms and the IFS interval is between about 10 ms and about 50 ms.

26. The network according to claim 21, wherein the IRFS and IFS information includes at least one from a set of: a time to quiet period (TTQP), a duration to quiet period (DQP) for IFS and IRFS intervals, an IRFS cycle offset, an IRFS cycle frame bitmap, and/or an IRFS duration for IRFSs.

27. A computer-readable device having instructions stored thereon for a method of quiet period management in secondary networks, the method comprising:
receiving intraframe sensing (IRFS) and interframe sensing (IFS) information from a co-existence manager;
detecting one or more access points (APs) broadcast of their intention of data transmission during an IRFS interval;
allocating an IRFS interval for dedicated access over an active channel between an AP and a component based on the received IRFS information and one or more parameters in the APs broadcast;
scheduling an IFS interval spanning multiple consecutive frames based on a cumulative report from the IRFS on a status of the active channel;
allocating the IFS interval for contentious access over a plurality of channels between a plurality of APs and corresponding components based on the received IFS information; and
sharing the IRFS interval and IFS interval on transmission ranges of the plurality of APs.

28. The computer-readable memory device according to claim 27, wherein the APs broadcast their intention of data transmission employing a unique access request packet (ARP) that includes at least one from a set of: a time stamp indicating a time of ARP creation, a superframe number specifying a channel and a superframe number for desired access, a frame number specifying a frame within a superframe defined by the superframe number, and an access duration defining a duration of access desired by a broadcasting AP.

29. The computer-readable memory device according to claim 28, wherein the method further comprises:
enabling dedicated access to the active channel to a requesting AP with a smallest time stamp on the same frame in the superframe during the IRFS.

30. The computer-readable medium memory device according to claim 28, wherein the method further comprises:
if the access duration in the ARP is less than the IRFS interval, enabling access to the active channel to a requesting AP with a second smallest time stamp on the same frame in the superframe during the IRFS.

31. The computer-readable memory device according to claim 27, wherein the channels are within Television White Spaces and the IRFS and IFS information are detected from a broadcast by a cognitive base station of a Wireless Regional Area Network (WRAN).

32. The computer-readable memory device according to claim 27, wherein two or more APs form an ad hoc emergency wireless network for exchanging one of multimedia, streaming video, and/or streaming audio data over available channels.

33. The computer-readable memory device according to claim 27, wherein the method further comprises:
broadcasting periodic updates on the IRFS and IFS information to the APs.

34. The computer-readable memory device according to claim 27, wherein access to the active channel in an allocated IFS interval is provided to a contending component employing multiple access collision avoidance.

* * * * *

UNITED STATES PATENT AND TRADEMARK OFFICE
CERTIFICATE OF CORRECTION

| | | |
|---|---|---|
| PATENT NO. | : 8,565,203 B2 | Page 1 of 1 |
| APPLICATION NO. | : 13/140102 | |
| DATED | : October 22, 2013 | |
| INVENTOR(S) | : Ghosh | |

It is certified that error appears in the above-identified patent and that said Letters Patent is hereby corrected as shown below:

In the Specifications:

In Column 9, Line 2, delete "AN" and insert -- A/V --, therefor.

In the Claims:

In Column 19, Line 24, in Claim 27, delete "computer-readable device" and insert -- computer-readable memory device --, therefor.

In Column 20, Line 18, in Claim 30, delete "computer-readable medium memory" and insert -- computer-readable memory --, therefor.

Signed and Sealed this
Thirteenth Day of May, 2014

Michelle K. Lee
*Deputy Director of the United States Patent and Trademark Office*